United States Patent [19]
Hirose

[11] 3,990,785
[45] Nov. 9, 1976

[54] ANAMORPHIC ZOOM LENS
[75] Inventor: Ryusho Hirose, Machida, Japan
[73] Assignee: Canon Kabushiki Kaisha, Tokyo, Japan
[22] Filed: Apr. 15, 1975
[21] Appl. No.: 568,314

Related U.S. Application Data
[63] Continuation of Ser. No. 398,553, Sept. 18, 1973, abandoned.

[30] Foreign Application Priority Data
Sept. 22, 1972 Japan.................................. 47-95310

[52] U.S. Cl................................ 350/181; 350/176; 350/177
[51] Int. Cl.².......................................... G02B 13/12
[58] Field of Search..................... 350/176, 177, 181

[56] References Cited
UNITED STATES PATENTS
3,751,136   8/1973   Kirchoff............................... 350/181

*Primary Examiner*—Paul A. Sacher
*Attorney, Agent, or Firm*—Toren, McGeady and Stanger

[57] ABSTRACT

The present invention relates to an anamorphic zoom lens of rear system intended for photography or projection, which, seen from the object, consists of an afocal zoom part, an afocal anamorphic lens system and an image forming lens system. The above mentioned anamorphic lens system consists of a front group at the side of the object and of a rear group at the side of the image plane, and is formed as an afocal system with the front group having positive power and the rear group having negative power. By means of this composition the relation between the position of the iris in the anamorphic lens and the anamorphic lens system is controlled in such a manner that the picture quality is improved.

1 Claim, 6 Drawing Figures

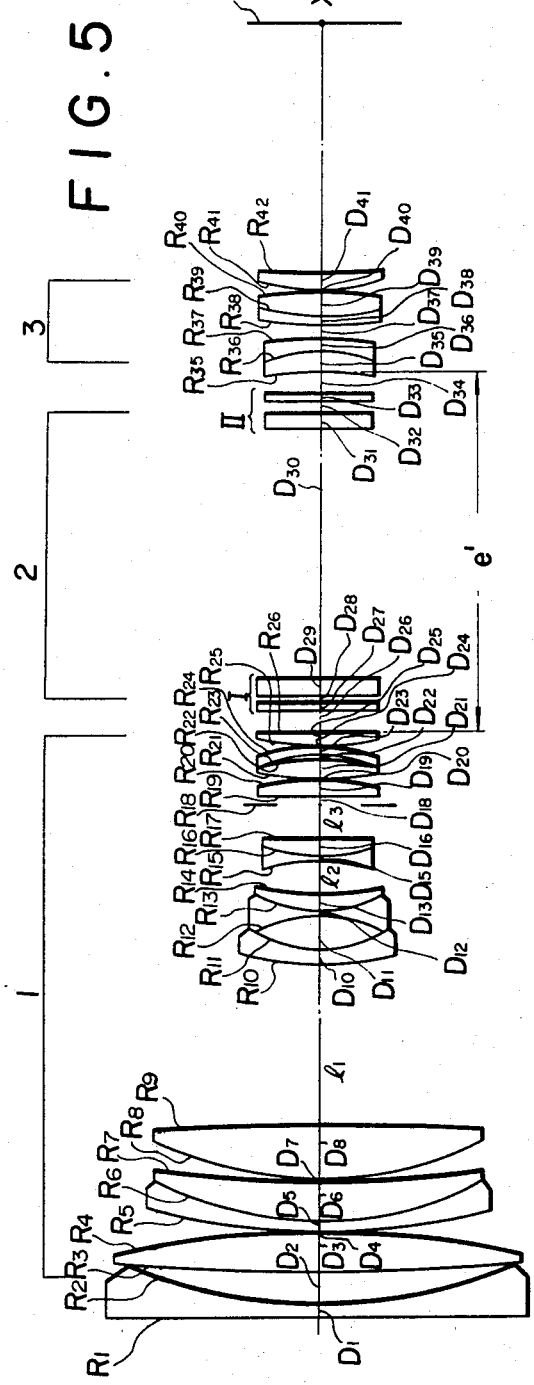
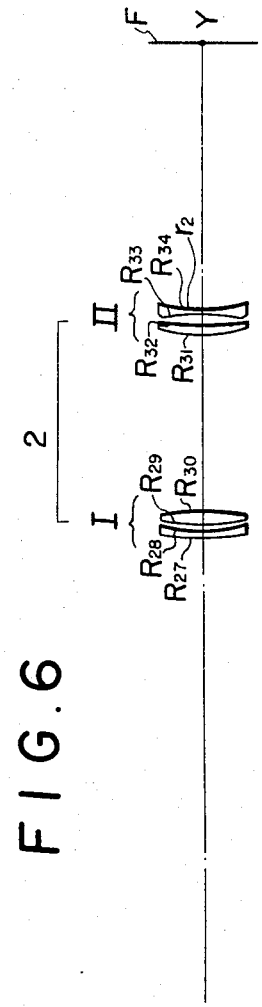

ANAMORPHIC ZOOM LENS

This is a continuation of application Ser. No. 398,553, filed Sept. 18, 1973 now abandoned.

DETAILED EXPLANATION OF INVENTION

As anamorphic lenses, for example, those with cylindrical lens or prism have so far been known. Further according to the position at which the cylindrical lens or the prism is installed, the anamorphic lens system is divided into two, namely the front anamorphic system in which the cylindrical lens or the prism is installed in front of the master lens and the rear anamorphic system in which the cylindricaal lens or the prism is installed behind the master lens. However, when the front anamorphic system is adopted for zoom lens, a large cylindrical lens has to be adopted and the focusing mechanism becomes complicated, so that the front anamorphic lens is not used in general and in its place the rear anamorphic system is usually adopted.

However, even the rear anamorphic system is mainly used as an anamorphic zoom system, while the front anamorphic system is preferred in case the master lens is not zoom lens from the point of view of picture quality. Namely at present the rear anamorphic system is adopted because of the advantage for operation or weight, neglecting the disadvantage for picture quality. Further it has been known that in the range of the third order aberration, the spherical aberrations can be expressed as the sum of the aberration taking place according to the direction of X of the cylindrical lens, and the aberration taking place according to the direction of y of the cylindrical lens while the term of the aberrations taking place according to other directions than X and Y are zero, in case the anamorphic system is afocal.

Further the term of the astigmatism representing the curvature of the image field is mainly decided with the position of the iris, whereby the more distant the iris is from the cylindrical lens, the lens the astigmatism in the range of the third order aberration is. The above mentioned fact has been also confirmed for every type of the anamorphic system known up to present according to the experience. For example in case of such known lens system according to the rear anamorphic system as shown in FIGS. 1 and 2 the spherical aberrations taking place according to other directions than X or Y of the cylindrical lens are so remarkable that the efficiency of the rear anamorphic system can not be avoided, even if the curvature of the image field is comparatively good and the spherical aberrations taking place according to only the directions X and Y are well corrected.

In FIGS. 1 and 2 respectively FIGS. 3 and 4, 1 and 1' are the master lenses, 2 and 2' the iris in the master lenses (the position of the iris), 3 and 3' the convex cylindrical lenses, 4 and 4' the concave cylindrical lenses and F the image plane. Further the direction along the generating line of cylindrical lens is called the X direction, while the direction normal to the X direction is called the Y direction.

On the other hand in case of the front anamorphic system, the anamorphic system being afocal, it is sufficient if the correction for the spherical aberration is carried out only according to the X and Y directions, whereby as shown in FIGS. 3 and 4 the iris is distant from the cylindrical lens so that the curvature of the image field is good while every aberration is well corrected. Hereby the front anamorphic system is used because the curvature of the image field is good when the master lenses are the monofocal lenses. On the other hand the front anamorphic system is scarcely used when the master lenses are the zoom lenses. The reason is that a large lens system has to be used, the ratio of anamorphosis is varied according to the distance of the object, complicated focusing means has to be used and the variation of aberration coming from zooming can not be corrected, in case in front of the zoom system cylindrical lenses are installed.

The purpose of the present invention is to introduce the advantage of easy operation and small weight into the zoom lens, by adopting the rear anamorphic system according to which the anamorphic system is arranged at the back of the zoom part.

The further purpose of the present invention is to improve the picture quality enough, which has so far being the largest weak point of the rear anamorphic system.

For this purpose the anamorphic lens system is divided into two groups, composing them with the cylindrical lenses, whereby the lens group at the side of the object is given a positive focal distance while the lens group at the side of the image plane a negative focal distance in such a manner that the astigmatism is corrected, while the spherical aberration is corrected by composing the system as afocal lens system. Further the distance between the rear surface of the afocal zoom part arranged closer to the object than the anamorphic lens system and the front surface of the image lens arranged at the side of the image forming plane is placed under a certain determined control according to the ratio of the anamorphosis or the radius of the surface of the last lens belonging to the anamorphic lens system is controlled in such a manner that the picture quality is improved.

BRIEF EXPLANATION OF DRAWINGS

FIG. 5 shows an embodiment of the cylindrical lens of the anamorphic zoom lens system in section along the X direction.

FIG. 6 shows the embodiment in section along the Y direction.

Figure 1:
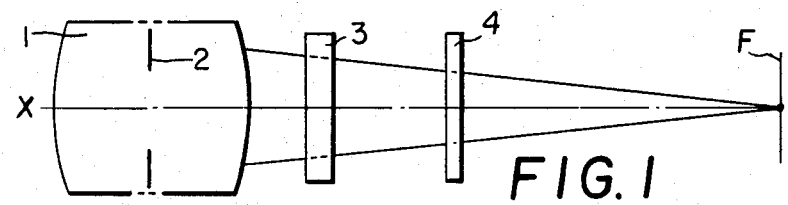
FIG. 1 and FIG. 2 show respectively a drawing to explain the principle of the already known rear anamorphic system.
Figure 2:
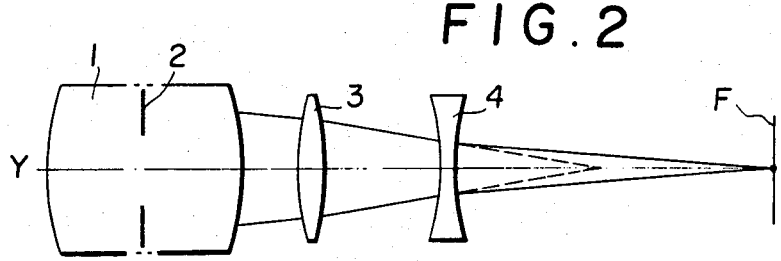
Figure 3:
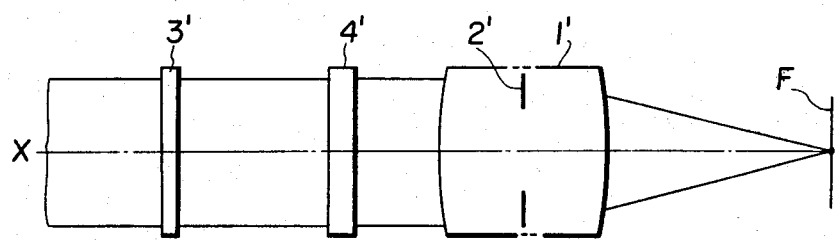
FIG. 3 and FIG. 4 show respectively a drawing to explain the principle of the already known front anamorphic system.
Figure 4:
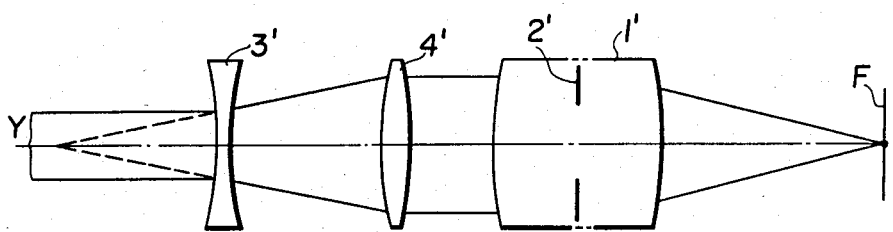

Below the present invention will be explained referring to the drawings.

In FIGS. 5 and 6, 1 is the afocal zoom part, 2 the anamorphic lens system, I the front (convex) group of the cylindrical lenses, II the rear (concave) group of the cylindrical lenses. Further 3 is the image forming lens system. The lens system in view of its effect consists of (the afocal zoom part) → (the glass block) → (the image forming system) as shown in FIG. 5, seen along X direction and on the other hand of (the afocal zoom part) → (the telephoto-converter of the image forming lens system) → (the image forming lens system) as shown in FIG. 6, seen along the Y direction.

Consequently, the ratio of anamorphosis can be represented with the ratio of the focal distance along X direction to the focal distance along Y direction.

Although the anamorphic lens system arranged as mentioned above, being afocal, the spherical aberration which is one of the weak points of the rear anamorphic system can be corrected in such a manner that the purpose to improve the picture quality can be reached, the curvature of the image field is degraded because the astignation peculiar to the anamorphic system takes place due to the fact that the iris diaphragm R18 is situated in front or in neighborhood of the surface of the cylindrical lenses. However by fulfilling the below mentioned conditions, the aberration can be corrected in such a manner that a superior picture quality can be obtained in such a manner that the strong point of the rear anamorphic system is being maintained.

As the first conditions in case of the anamorphic system, $f_1$ must be greater than zero while at the same time $f_2$ must be smaller than zero;

$$f_1 > 0 \text{ and } f_2 < 0 \qquad 1.$$

Hereby $f_1$ is the focal length of the front group I, while $f_2$ is the focal length of the rear group II. In case the condition (1) is not fulfilled, namely $f_1 < 0$ and $f_2 > 0$, the anamorphic lens system serves as wide angle converter (along the X direction) toward the image forming lens system. This means that a light beam with wider angle enters into the anamorphic lens system, which disturbs the purpose to improve the curvature of the image field and therefore it is essential to fulfill the condition (1).

Further in case of the anamorphic lens system to be placed behind the afocal zoom system the following condition must be fulfilled;

$$\left|\frac{f_2}{f_1}\right| < 1$$

$$e = f_1 - |f_2| \qquad (2)$$

Hereby $e$ is the distance between the principal point of the front group I and that of the rear group II of the anamorphic lens system. The above is the condition in order that the anamorphic lens system becomes afocal, whereby if the anamorphic system is not afocal, the aberrations taking place along other directions than X and Y becomes so remarkable that the picture quality is decreased as mentioned above, and therefore it is essential to fulfill the condition (2).

Further the anamorphic zoom lens should fulfill the below mentioned condition;

$$a.f_R \leq e' \qquad 3$$

whereby the ratio of anamorphosis is greater than 1.5 ($|f_1/f_2|<1.5$), $a = 0.8$, while the ratio of anamorphosis is smaller than 1.5 ($|f_1/f_2|<1.5$), $a = 0.5$, $f_R$ is the focal length of the image forming lens system, while $e'$ is the distance between the afocal zoom part and the image forming lens system. The above is the condition which is essential to correct the aberration taking place along other directions than X and Y of the cylindrical lens in the anamorphic zoom lens whose aberration along the X direction of the cylindrical lens is well corrected in order that the necessary quality can be maintained.

Namely the total length of an anamorphic zoom lens becomes shorter when the condition (3) is not fulfilled, because the distance e between the afocal zoom part and the image forming lens system decides the total length. This means that under the conditions (1) and (2) the refraction by the cylindrical lens becomes stronger and for example only along the Y direction of the cylindrical lens the Petzval sum becomes negative in such a manner that the curvature of the image field becomes remarkably inferior. Further the stronger the refraction by the cylindrical lens is, the more the aberrations peculiar to the cylindrical lens along other directions than X and Y directions are increased, in such a manner that the correction of the picture quality and especially of the curvature of the image field becomes impossible.

However it is clear that the condition (3) depends much on the ratio of the anamorphosis (the ratio of the focal distances along the Y direction), whereby for example the closer the ratio of the anamorphosis is to 1, the smaller the influence of the cylindrical lens is, so that in order to reach an ordinary spherical lens, the condition (3) has to be fulfilled according to the ratio of the anamorphosis.

In order to correct the aberration of the cylindrical lens shown in FIG. 5 along the X direction, it is sufficient to carry out the correction of the aberration of the zoom part and the image forming lens system so that the best quality could be obtained under the condition (3) as is the case of the correction of the aberration of an ordinary zoom lens, considering the cylindrical lens as glass block.

However attention has to be paid so that the aberrations taking place at the zoom part and the image forming lens system should compensate each other in case of the correction of the aberration of the cylindrical lens along other directions than the X direction, whereby further attention has to be paid along every direction of the cylindrical lens.

Consequently, the compositions of the cylindrical lens has to be determined, taking the conditions (1), (2) and (3) into consideration.

As is shown in the drawing the cylindrical lens system is divided into the front group and the rear group, whereby the front group I consists of a convex lens or a convex lens system being compered of a combination of convex lenses and concave lenses, while in the rear group II convex lenses and concave lenses are arranged seen from the side of the object in such a manner the rear group II makes a concave lens system as a whole. Hereby the order of convex lenses and concave lenses can be changed in each lens group.

For the cylindrical lens group arranged as mentioned above, it is essential that the radius $r_2$ at the side of image forming plane of the concave lens in the rear group II has to be much larger than zero.

$$r_2 \geq 0 \qquad (4)$$

when a cylindrical lens is introduced into a zoom lens whose aberration is well corrected as seen along the X direction. The angle of the light flux coming into the image forming lens system along the Y direction is loose under the condition (1), so that the position of the image light passing through the image forming lens differs.

Because the image forming lens 3 is distant enough from the iris diaphragm R18 as shown in FIGS. 5 and 6, especially the correction of the astigmatism (the curvature of the image field) is essential, whereby the correction of the curvature of the image field is made possible by arranging a concave lens for the cylindrical lens group distant enough from the iris and by making $r_2$ much larger than zero ($r_2 \geq 0$).

As mentioned above the present invention offers an optics which is superior in the picture quality and the operation and can be constructed light.

Below the embodiments of the present invention are given in Figures.

| | R | D | N | V |
|---|---|---|---|---|
| 1 | ∞ | 3.50000 | 1.80518 | 25.4 |
| 2 | 127.03100 | 10.80000 | | |
| 3 | 823.29000 | 11.25000 | 1.75700 | 47.9 |
| 4 | −210.54107 | 0.2000 | | |
| 5 | 185.31600 | 3.25000 | 1.75520 | 27.5 |
| 6 | 89.33900 | 12.75000 | 1.51633 | 64.1 |
| 7 | 423.10000 | 0.20000 | | |
| 8 | 95.47700 | 14.75000 | 1.80610 | 40.8 |
| 9 | −786.13000 | $l_1$ | | |
| 10 | 75.52000 | 1.50000 | 1.67000 | 57.4 |
| 11 | 29.01160 | 10.35000 | | |
| 12 | −43.50220 | 1.50000 | 1.60311 | 60.7 |
| 13 | 27.83100 | 6.00000 | 1.71736 | 29.5 |
| 14 | 156.37390 | $l_2$ | | |
| 15 | −65.62300 | 1.25000 | 1.58900 | 48.6 |
| 16 | 35.9950 | 3.50000 | 1.59270 | 35.6 |
| 17 | 313.82043 | $l_3$ | | |
| 18 | — | 1.50000 | | |
| 19 | −364.93000 | 3.00000 | 1.60729 | 59.4 |
| 20 | −74.95544 | 0.20000 | | |
| 21 | 151.50200 | 3.00000 | 1.60729 | 59.4 |
| 22 | −134.09000 | 1.15000 | | |
| 23 | −52.80000 | 1.80000 | 1.80518 | 25.4 |
| 24 | −77.46800 | 0.20000 | | |
| 25 | 77.17700 | 4.00000 | 1.60729 | 59.4 |
| 26 | 443.28500 | 6.00000 | | |
| 27 | 75.8 | 1.50000 | 1.80610 | 40.8 |
| 28 | 38. | 1.150000 | | |
| 29 | 38. | 4.00000 | 1.48749 | 70.1 |
| 30 | −129.63 | 60.387 | | |
| 31 | 46.05 | 3.50000 | 1.72342 | 38.0 |
| 32 | 129.63 | 3.00000 | | |
| 33 | −110 | 1.50000 | 1.77250 | 49.6 |
| 34 | 44.8 | 4.50000 | | |
| 35 | −232.49000 | 7.00000 | 1.62230 | 53.2 |
| 36 | −34.18800 | 2.00000 | 1.80610 | 40.8 |
| 37 | −103.82000 | 4.95000 | | |
| 38 | 196.80000 | 1.75000 | 1.85518 | 25.4 |
| 39 | 58.50300 | 6.75000 | 1.51112 | 60.5 |
| 40 | −128.14832 | 0.20000 | | |
| 41 | 53.14800 | 5.00000 | 1.64850 | 53.0 |
| 42 | 482.29000 | | | |

| | In case f = 25 (Along the X direction) | In case f = 125 |
|---|---|---|
| $l_1$ | 0.86 | 59.0 |
| $l_2$ | 60.045 | 1.905 |
| $l_3$ | 2.633 | 2.633 |

Hereby R is the radius of each lens, D the thickness or the air gap of each lens, N the fraction toward the $d$ line and V the Abbe's number.

What is claimed is:

1. An anamorphic zoom lens in which there is an image side and an object side, said anamorphic zoom lens comprising an afocal zoom system having an optical axis, an image-forming lens system arranged at the image side on the optical axis and spaced from said afocal zoom system, an anamorphic lens system interposed between said afocal zoom system and said image-forming lens system, a variable diaphragm in front of said anamorphic lens system, said anamorphic lens system comprising an afocal optical system having two lens groups composed of cylindrical lenses, respectively, spaced from each other on the optical axis, one lens group of said two lens groups located at the object side and having a positive focal lens and the other lens group being located at said image side having a negative focal lens said diaphragm being located within said afocal zoom system, said anamorphic zoom lens further comprising a final cylindrical lens surface on the image side lens group having a concave plane facing the image side, the two lens groups of said anamorphic lens system containing a positive cylindrical lens and a negative cylindrical lens which are separated from each other, the object side lens group having the positive focal length in said anamorphic lens system being provided with a negative meniscus cylindrical lens facing the convex surface toward the object side and a biconvex cylindrical lens which are arranged in that order from the object side, and the image side lens group with the negative focal length is provided with a positive meniscus cylindrical lens facing the convex surface thereof toward the object side and a biconcave cylindrical lens which are arranged in that order from the object side, and wherein

| | R | D | N | V |
|---|---|---|---|---|
| 1 | ∞ | 3.50000 | 1.80518 | 25.4 |
| 2 | 127.03100 | 10.80000 | | |
| 3 | 823.29000 | 11.25000 | 1.75700 | 47.9 |
| 4 | −210.54107 | 0.2000 | | |
| 5 | 185.31600 | 3.25000 | 1.75520 | 27.5 |
| 6 | 89.33900 | 12.75000 | 1.51633 | 64.1 |
| 7 | 423.10000 | 0.20000 | | |
| 8 | 95.47700 | 14.75000 | 1.80610 | 40.8 |
| 9 | −786.13000 | $l_1$ | | |
| 10 | 75.52000 | 1.50000 | 1.67000 | 57.4 |
| 11 | 29.01160 | 10.35000 | | |
| 12 | −43.50220 | 1.50000 | 1.60311 | 60.7 |
| 13 | 27.83100 | 6.00000 | 1.71736 | 29.5 |
| 14 | 156.37390 | $l_2$ | | |
| 15 | −65.62300 | 1.25000 | 1.58900 | 48.6 |
| 16 | 35.9950 | 3.50000 | 1.59270 | 35.6 |
| 17 | 313.82043 | $l_3$ | | |
| 18 | — | 1.50000 | | |
| 19 | −364.93000 | 3.00000 | 1.60729 | 59.4 |
| 20 | −74.95544 | 0.20000 | | |
| 21 | 151.50200 | 3.00000 | 1.60729 | 59.4 |
| 22 | −134.09000 | 1.15000 | | |
| 23 | −52.80000 | 1.80000 | 1.80518 | 25.4 |
| 24 | −77.46800 | 0.20000 | | |
| 25 | 77.17700 | 4.00000 | 1.60729 | 59.4 |
| 26 | 443.28500 | 6.00000 | | |
| 27 | 75.8 | 1.50000 | 1.80610 | 40.8 |
| 28 | 38. | 1.150000 | | |
| 29 | 38. | 4.00000 | 1.48749 | 70.1 |
| 30 | −129.63 | 60.387 | | |
| 31 | 46.05 | 3.50000 | 1.72342 | 38.0 |
| 32 | 129.63 | 3.00000 | | |
| 33 | −110 | 1.50000 | 1.77250 | 49.6 |
| 34 | 44.8 | 4.50000 | | |
| 35 | −232.49000 | 7.00000 | 1.62230 | 53.2 |
| 36 | −34.18800 | 2.00000 | 1.80610 | 40.8 |
| 37 | −103.82000 | 4.95000 | | |
| 38 | 196.80000 | 1.75000 | 1.85518 | 25.4 |
| 39 | 58.50300 | 6.75000 | 1.51112 | 60.5 |
| 40 | −128.14832 | 0.20000 | | |
| 41 | 53.14800 | 5.00000 | 1.64850 | 53.0 |
| 42 | 482.29000 | | | |

| | In case f = 25 (Along the X direction) | In case f = 125 |
|---|---|---|
| $l_1$ | 0.86 | 59.0 |
| $l_2$ | 60.045 | 1.905 |
| $l_3$ | 2.633 | 2.633 |

Where R is the radius of each lens, D the thickness or the air gap of each lens, N the fraction toward the $d$ line and V the Abbe's number.

* * * * *